US012266971B2

(12) United States Patent
Takeda et al.

(10) Patent No.: US 12,266,971 B2
(45) Date of Patent: Apr. 1, 2025

(54) ADHESIVELY-LAMINATED CORE FOR STATOR, METHOD OF MANUFACTURING THE SAME, AND ELECTRIC MOTOR

(71) Applicant: NIPPON STEEL CORPORATION, Tokyo (JP)

(72) Inventors: Kazutoshi Takeda, Tokyo (JP); Hiroyasu Fujii, Tokyo (JP); Shinsuke Takatani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 448 days.

(21) Appl. No.: 17/299,226

(22) PCT Filed: Dec. 17, 2019

(86) PCT No.: PCT/JP2019/049269
§ 371 (c)(1),
(2) Date: Jun. 2, 2021

(87) PCT Pub. No.: WO2020/129927
PCT Pub. Date: Jun. 25, 2020

(65) Prior Publication Data
US 2022/0037939 A1    Feb. 3, 2022

(30) Foreign Application Priority Data

Dec. 17, 2018   (JP) ................... 2018-235870

(51) Int. Cl.
*H02K 1/16*      (2006.01)
*H02K 15/02*     (2006.01)
(52) U.S. Cl.
CPC ............. *H02K 1/16* (2013.01); *H02K 15/024* (2013.01)
(58) Field of Classification Search
CPC .............................. H02K 1/16; H02K 15/024
(Continued)

(56) References Cited

U.S. PATENT DOCUMENTS

| 3,386,058 A | 5/1968 | Michel |
| 4,025,379 A | 5/1977 | Whetstone |

(Continued)

FOREIGN PATENT DOCUMENTS

| CN | 102792556 A | 11/2012 |
| DE | 102005038778 A1 | 3/2007 |

(Continued)

OTHER PUBLICATIONS

JP 2016171652 Machine Translation (Year: 2016).*

(Continued)

*Primary Examiner* — Tran N Nguyen
*Assistant Examiner* — Masoud Vaziri
(74) *Attorney, Agent, or Firm* — Renner, Otto, Boisselle & Sklar, LLP (57) ABSTRACT

Provided is an electric motor which includes an adhesively-laminated core for a stator having excellent productivity and high mechanical strength and that is thus capable of reducing vibration and noise of an electric motor and suppressing iron loss. The adhesively-laminated core for a stator includes electrical steel sheets laminated on each other and each coated on both sides with an insulation coating, and an adhesion part disposed between the electrical steel sheets adjacent to each other in a stacking direction and configured to cause the electrical steel sheets to be adhered to each other. All sets of the electrical steel sheets adjacent to each other in the stacking direction are adhered by the adhesion part, an adhesive forming the adhesion part includes a fast-curing type adhesive and a thermosetting adhesive, and the adhesion part is partially provided between the electrical steel sheets adjacent to each other in the stacking direction.

5 Claims, 4 Drawing Sheets

(58) Field of Classification Search
USPC .................................................. 310/216.065
See application file for complete search history.

(56) References Cited

U.S. PATENT DOCUMENTS

| | | | |
|---|---|---|---|
| 4,103,195 | A | 7/1978 | Torossian |
| 4,413,406 | A | 11/1983 | Bennett |
| 5,142,178 | A | 8/1992 | Kloster et al. |
| 5,248,405 | A | 9/1993 | Kaneda et al. |
| 5,338,996 | A | 8/1994 | Yamamoto |
| 5,448,119 | A | 9/1995 | Kono et al. |
| 5,994,464 | A | 11/1999 | Ohsawa et al. |
| 6,495,936 | B2 | 12/2002 | Kikuchi et al. |
| 6,653,758 | B2 | 11/2003 | Tsuneyoshi et al. |
| 7,298,064 | B2 | 11/2007 | Yamamoto |
| 7,562,439 | B2 | 7/2009 | Yamamoto |
| 7,859,163 | B2 | 12/2010 | Bertocchi et al. |
| 7,952,254 | B2 | 5/2011 | Cho et al. |
| 7,960,890 | B2 * | 6/2011 | Miyake ................ H02K 15/022 310/43 |
| 8,015,691 | B2 | 9/2011 | Miyake |
| 8,580,217 | B2 * | 11/2013 | Hipszki ...................... C09J 7/21 423/343 |
| 8,581,468 | B2 | 11/2013 | Kudose et al. |
| 8,697,811 | B2 | 4/2014 | Kishi et al. |
| 8,943,677 | B2 | 2/2015 | Gerster et al. |
| 9,331,530 | B2 | 5/2016 | Jang et al. |
| 9,512,335 | B2 | 12/2016 | Hoshi et al. |
| 9,770,949 | B2 | 9/2017 | Fudemoto et al. |
| 9,833,972 | B2 | 12/2017 | Ohishi et al. |
| 10,340,754 | B2 | 7/2019 | Ogino et al. |
| 10,348,170 | B2 | 7/2019 | Izumi et al. |
| 10,476,321 | B2 | 11/2019 | Li et al. |
| 10,491,059 | B2 | 11/2019 | Murakami et al. |
| 10,547,225 | B2 | 1/2020 | Hattori et al. |
| 10,574,112 | B2 | 2/2020 | Tomonaga |
| 10,819,201 | B2 | 10/2020 | Thumm et al. |
| 10,840,749 | B2 | 11/2020 | Chaillou et al. |
| 11,056,934 | B2 | 7/2021 | Kubota et al. |
| 11,616,407 | B2 | 3/2023 | Hino et al. |
| 2002/0047459 | A1 | 4/2002 | Adaeda et al. |
| 2002/0163277 | A1 | 11/2002 | Miyake et al. |
| 2004/0056556 | A1 | 3/2004 | Fujita |
| 2004/0124733 | A1 | 7/2004 | Yamamoto et al. |
| 2006/0043820 | A1 | 3/2006 | Nakahara |
| 2007/0024148 | A1 | 2/2007 | Maita et al. |
| 2007/0040467 | A1 | 2/2007 | Gu |
| 2007/0182268 | A1 | 8/2007 | Hashiba et al. |
| 2009/0026873 | A1 | 1/2009 | Matsuo et al. |
| 2009/0195110 | A1 | 8/2009 | Miyaki |
| 2009/0230812 | A1 | 9/2009 | Cho et al. |
| 2010/0090560 | A1 | 4/2010 | Myojin |
| 2010/0197830 | A1 | 8/2010 | Hayakawa et al. |
| 2010/0219714 | A1 | 9/2010 | Abe et al. |
| 2010/0244617 | A1 | 9/2010 | Nobata et al. |
| 2011/0180216 | A1 | 7/2011 | Miyake |
| 2011/0269894 | A1 | 11/2011 | Miyamoto |
| 2012/0088096 | A1 | 4/2012 | Takeda et al. |
| 2012/0128926 | A1 | 5/2012 | Ohishi et al. |
| 2012/0156441 | A1 | 6/2012 | Gerster |
| 2012/0235535 | A1 | 9/2012 | Watanabe |
| 2012/0288659 | A1 | 11/2012 | Hoshi et al. |
| 2013/0244029 | A1 | 9/2013 | Igarashi et al. |
| 2014/0023825 | A1 | 1/2014 | Igarashi et al. |
| 2015/0028717 | A1 | 1/2015 | Luo et al. |
| 2015/0097463 | A1 * | 4/2015 | Blocher ................... H02K 1/28 310/216.065 |
| 2015/0130318 | A1 | 5/2015 | Kitada et al. |
| 2015/0256037 | A1 | 9/2015 | Kudose |
| 2015/0337106 | A1 | 11/2015 | Kajihara |
| 2016/0023447 | A1 | 1/2016 | Shimizu |
| 2016/0352159 | A1 | 12/2016 | Li et al. |
| 2016/0352165 | A1 | 12/2016 | Fubuki |
| 2017/0117758 | A1 | 4/2017 | Nakagawa |
| 2017/0287625 | A1 | 10/2017 | Ito |
| 2017/0342519 | A1 | 11/2017 | Uesaka et al. |
| 2017/0368590 | A1 | 12/2017 | Senda et al. |
| 2018/0030292 | A1 | 2/2018 | Gotou |
| 2018/0056629 | A1 | 3/2018 | Hamamura |
| 2018/0134926 | A1 | 5/2018 | Lei et al. |
| 2018/0159389 | A1 | 6/2018 | Nishikawa |
| 2018/0212482 | A1 | 7/2018 | Nigo |
| 2018/0248420 | A1 | 8/2018 | Enokizono et al. |
| 2018/0295678 | A1 | 10/2018 | Okazaki et al. |
| 2018/0309330 | A1 | 10/2018 | Ueda |
| 2018/0342925 | A1 | 11/2018 | Horii et al. |
| 2019/0010361 | A1 | 1/2019 | Hoshi |
| 2019/0040183 | A1 | 2/2019 | Yoshida et al. |
| 2020/0048499 | A1 | 2/2020 | Andou et al. |
| 2020/0099263 | A1 | 3/2020 | Hirosawa et al. |
| 2020/0186014 | A1 | 6/2020 | Kusuyama |
| 2021/0296975 | A1 | 9/2021 | Hino et al. |

FOREIGN PATENT DOCUMENTS

| | | |
|---|---|---|
| EP | 3553799 A1 | 10/2019 |
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 62-009951 A | 1/1987 |
| JP | 63-207639 A | 8/1988 |
| JP | 01-168777 A | 7/1989 |
| JP | 03-124247 A | 5/1991 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 10-304610 A | 11/1998 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-334648 A | 12/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009072035 A | 4/2009 |
| JP | 2009-177895 A | 8/2009 |
| JP | 2010-004716 A | 1/2010 |
| JP | 2010081659 A | 4/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |

(56) References Cited

FOREIGN PATENT DOCUMENTS

| | | | |
|---|---|---|---|
| JP | 2012-061820 A | 3/2012 |
| JP | 2012060773 A | 3/2012 |
| JP | 2012-120299 A | 6/2012 |
| JP | 2012196100 A | 10/2012 |
| JP | 2013-089883 A | 5/2013 |
| JP | 2013-181101 A | 9/2013 |
| JP | 2013-253153 A | 12/2013 |
| JP | 5423465 B2 | 2/2014 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016167907 A | 9/2016 |
| JP | 2016171652 A * | 9/2016 |
| JP | 2017-005906 A | 1/2017 |
| JP | 2017011863 A * | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2017-0087915 A | 7/2017 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/207277 A1 | 11/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129941 A1 | 6/2020 |
| WO | 2020/129942 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

JP 2017011863 Machine Translation (Year: 2017).*
JP 2017011863 A Machine Translation (Year: 2017).*
JP-2016171652-A Machine Translation (Year: 2016).*
Datasheet of Nylon 6, Cast (Year: N/A, Printed Jun. 28, 2023).
Japanese Industrial Standard (JIS) C 2552: 2014, relevance discussed in specification.
Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016, relevance discussed in specification.
Japanese Industrial Standard (JIS) K 7121-1987, relevance discussed in specification.
Japanese Industrial Standard (JIS) K 6850: 1999.
The papers of technical meetings in the Institute of Electrical Engineers of Japan, RM-92-79, 1992, relevance discussed in specification.
Matweb, "Plaskolite West Optix® CA-41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).

* cited by examiner

ADHESIVELY-LAMINATED CORE FOR STATOR, METHOD OF MANUFACTURING THE SAME, AND ELECTRIC MOTOR

TECHNICAL FIELD

The present invention relates to an adhesively-laminated core for a stator, a method of manufacturing the same, and an electric motor.

Priority is claimed on Japanese Patent Application No. 2018-235870 filed in Japan on Dec. 17, 2018, the content of which is incorporated herein by reference.

BACKGROUND ART

Conventionally, a laminated core in which a plurality of electrical steel sheets are laminated on each other is known as a core used in an electric motor. The plurality of electrical steel sheets are joined by a method such as welding, adhesion, fastening, or the like. However, joining by welding or fastening makes it difficult to reduce vibration of an electric motor and obtain a high mechanical strength.

Patent Document 1 discloses a laminated core in which electrical steel sheets are partially adhered and laminated with a cyanoacrylate-based adhesive, and then the electrical steel sheets are entirely adhered to each other by being vacuum-impregnated with an epoxy resin. Patent Document 2 discloses a laminated core in which a laminate in which electrical steel sheets are laminated is coated with a cyanoacrylate-based instant adhesive on a side surface thereof to be temporarily fixed, and then the electrical steel sheets are entirely adhered to each other by being impregnated with a thermosetting resin such as an epoxy resin.

CITATION LIST

Patent Document

[Patent Document 1]
Japanese Unexamined Patent Application, First Publication No. 2003-264962
[Patent Document 2]
Japanese Unexamined Patent Application, First Publication No. 2005-019642

SUMMARY OF THE INVENTION

Problems to be Solved by the Invention

However, the conventional methods such as Patent Documents 1 and 2 have poor productivity, and iron loss that can be incurred in the electric motor cannot be sufficiently suppressed.

An object of the present invention is to provide an adhesively-laminated core for a stator having excellent productivity and high mechanical strength and that is thus capable of reducing vibration and noise of an electric motor and suppressing iron loss, a method of manufacturing the same, and an electric motor including the adhesively-laminated core for a stator.

Means for Solving the Problem

One embodiment of the present invention includes the following aspects.

[1] An adhesively-laminated core for a stator including a plurality of electrical steel sheets which are stacked on each other and of which both surfaces coated with an insulation coating, and an adhesion part which is disposed between the electrical steel sheets adjacent to each other in a stacking direction and adheres the electrical steel sheets to each other, in which all sets of the electrical steel sheets adjacent to each other in the stacking direction are adhered by a plurality of adhesion parts, an adhesive forming the adhesion part includes a fast-curing type adhesive and a thermosetting adhesive, and the adhesion part is partially provided between the electrical steel sheets adjacent to each other in the stacking direction.

[2] The adhesively-laminated core for a stator according to [1], in which the adhesion part includes a first adhesion part formed with the fast-curing type adhesive, and a second adhesion part formed with the thermosetting adhesive.

[3] The adhesively-laminated core for a stator according to [2], in which the adhesion part includes the first adhesion part provided between tooth parts of the electrical steel sheets, and the second adhesion part provided between core back parts of the electrical steel sheets.

[4] The adhesively-laminated core for a stator according to [2] or [3], in which the first adhesion part has a dot shape with an average diameter of 3 mm or more and 7 mm or less, the second adhesion part has a dot shape with an average diameter of 5 mm or more and 10 mm or less, and a proportion of an adhesion area of the first adhesion part is 5% or more and 50% or less and a proportion of an adhesion area of the second adhesion part is 50% or more and 95% or less with respect to a total adhesion area of the adhesion part between the electrical steel sheets.

[5] The adhesively-laminated core for a stator according to [2] or [3], in which the first adhesion part has a dot shape with an average diameter of 3 mm or more and 7 mm or less, the second adhesion part has a dot shape with an average diameter of 5 mm or more and 10 mm or less, and a proportion of an adhesion area of the first adhesion part is 5% or more and less than 50% and a proportion of an adhesion area of the second adhesion part is 50% or more and 95% or less with respect to a total adhesion area of the adhesion part between the electrical steel sheets.

[6] The adhesively-laminated core for a stator according to any one of [1] to [5], in which the fast-curing type adhesive is a cyanoacrylate-based adhesive.

[7] The adhesively-laminated core for a stator according to any one of [1] to [6], in which the thermosetting adhesive is an epoxy resin-based adhesive containing an epoxy resin having a glass transition temperature of 80° C. or higher and 150° C. or lower.

[8] The adhesively-laminated core for a stator according to any one of [1] to [7], in which an adhesion area ratio $Q_{B0}$ of the adhesion part to the tooth part is 10% or more and 70% or less and an adhesion area ratio $Q_{40}$ of the adhesion part to the core back part is 40% or more and 90% or less between the electrical steel sheets.

[9] A method of manufacturing an adhesively-laminated core for a stator which is a method of manufacturing the adhesively-laminated core for a stator according to [1], the method including repeating an operation in which the fast-curing type adhesive and the thermosetting adhesive are applied to a part of a surface of the electrical steel sheet, the electrical steel sheet is stacked on another electrical steel sheet, and then the electrical steel sheets are press-stacked to form the adhesion part.

[10] An electric motor including the adhesively-laminated core for a stator according to any one of [1] to [8].

Effects of the Invention

According to the present invention, it is possible to provide an adhesively-laminated core for a stator having excellent productivity and high mechanical strength and that is thus capable of reducing vibration and noise of an electric motor and suppressing iron loss, a method of manufacturing the same, and an electric motor including the adhesively-laminated core for a stator.

EMBODIMENTS FOR IMPLEMENTING THE INVENTION

Hereinafter, an adhesively-laminated core for a stator according to one embodiment of the present invention and an electric motor including the adhesively-laminated core for a stator will be described with reference to the drawings. In the present embodiment, a motor, specifically an AC motor, more specifically a synchronous motor, and even more specifically a permanent magnetic electric motor, will be described as one example of the electric motor. A motor of this type is suitably employed for, for example, an electric automobile.

Figure 1:
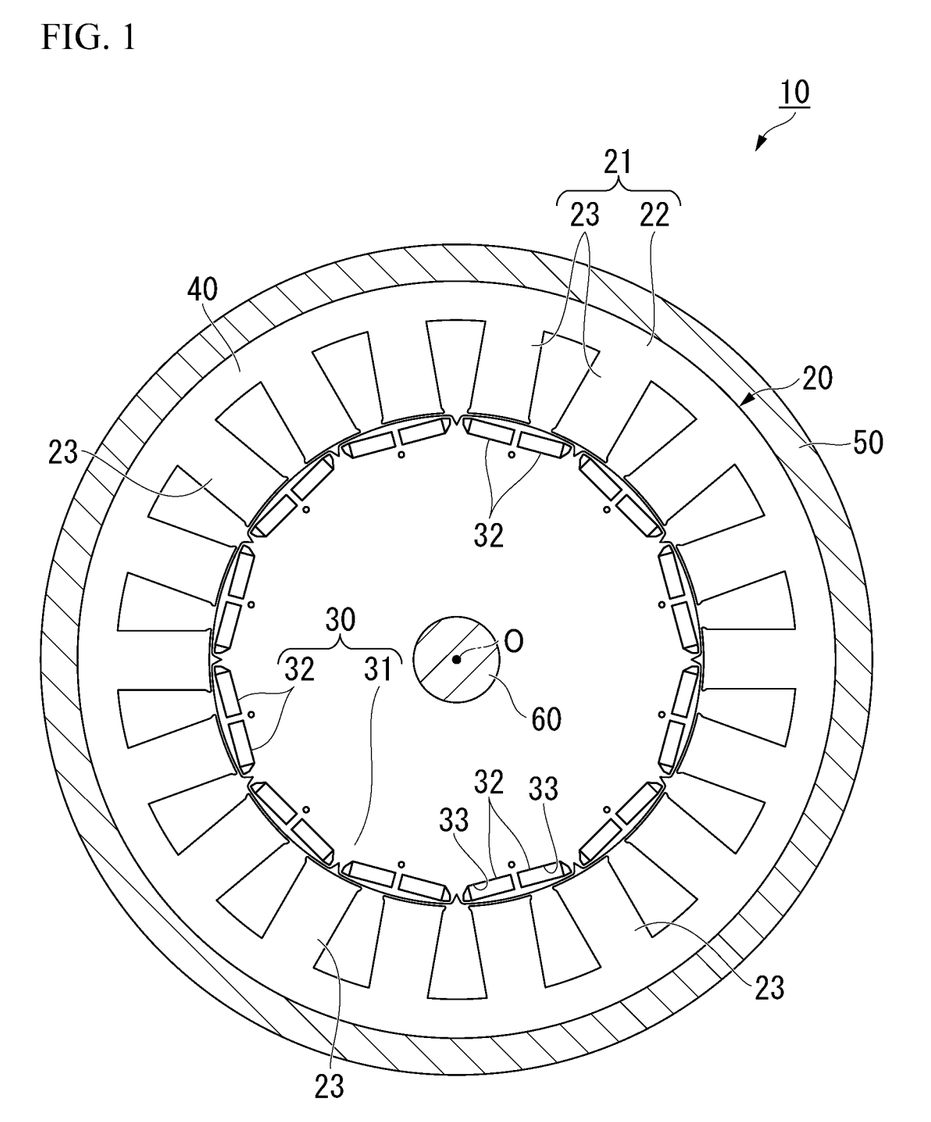
FIG. 1 is a cross-sectional view of an electric motor including an adhesively-laminated core for a stator according to one embodiment of the present invention.

As illustrated in FIG. 1, an electric motor 10 includes a stator 20, a rotor 30, a case 50, and a rotary shaft 60. The stator 20 and the rotor 30 are accommodated in the case 50. The stator 20 is fixed to an inside of the case 50.

In the present embodiment, an inner rotor type in which the rotor 30 is positioned on a radially inner side of the stator 20 is employed as the electric motor 10. However, an outer rotor type in which the rotor 30 is positioned on an outer side of the stator 20 may also be employed as the electric motor 10. Also, in the present embodiment, the electric motor 10 is a 12-pole 18-slot three-phase AC motor. However, the number of poles, the number of slots, the number of phases, or the like can be changed as appropriate.

The electric motor 10 can rotate at a rotation speed of 1000 rpm by applying, for example, an excitation current having an effective value of 10 A and a frequency of 100 Hz to each phase.

The stator 20 includes an adhesively-laminated core for a stator (hereinafter referred to as a stator core) 21 and a winding (not illustrated).

The stator core 21 includes an annular core back part 22 and a plurality of tooth parts 23. Hereinafter, a direction along a central axis O of the stator core 21 (or the core back part 22) is referred to as an axial direction, a radial direction of the stator core 21 (or the core back part 22) (i.e., a direction orthogonal to the central axis O) is referred to as a radial direction, and a circumferential direction of the stator core 21 (or the core back part 22) (i.e., a direction revolving around the central axis O) is referred to as a circumferential direction.

The core back part 22 is formed in an annular shape in a plan view of the stator 20 along the axial direction.

The plurality of tooth parts 23 protrude inward in the radial direction (toward the central axis O of the core back part 22 in the radial direction) from an inner circumference of the core back part 22. The plurality of tooth parts 23 are disposed at equiangular intervals in the circumferential direction. In the present embodiment, 18 tooth parts 23 are provided at every 20 degrees in terms of the central angle with the central axis O as a center. The plurality of tooth parts 23 are formed to have the same shape and the same size with each other. Therefore, the plurality of tooth parts 23 have the same thickness dimension with each other.

The windings are wound around the tooth parts 23. The windings may be a concentrated windings or a distributed windings.

The rotor 30 is disposed on a radially inner side with respect to the stator 20 (the stator core 21). The rotor 30 includes a rotor core 31 and a plurality of permanent magnets 32.

The rotor core 31 is formed in a ring shape (an annular shape) disposed coaxially with the stator 20. The rotary shaft 60 is disposed in the rotor core 31. The rotary shaft 60 is fixed to the rotor core 31.

The plurality of permanent magnets 32 are fixed to the rotor core 31. In the present embodiment, a set of two permanent magnets 32 forms one magnetic pole. The plurality of sets of permanent magnets 32 are disposed at equiangular intervals in the circumferential direction. In the present embodiment, 12 sets of the permanent magnets 32 (24 in total) are provided at every 30 degrees in terms of the central angle with the central axis O as a center.

In the present embodiment, an interior permanent magnet motor is adopted as the permanent magnetic electric motor. A plurality of through holes 33 penetrating the rotor core 31 in the axial direction are formed in the rotor core 31. The plurality of through holes 33 are provided to correspond to a disposition of the plurality of permanent magnets 32. The permanent magnets 32 are each fixed to the rotor core 31 in a state in which it is disposed inside the corresponding through hole 33. Fixing of each permanent magnet 32 to the rotor core 31 can be realized, for example, by causing an outer surface of the permanent magnet 32 and an inner surface of the through hole 33 to be adhered to each other using an adhesive or the like. Further, a surface permanent magnet motor may be adopted as the permanent magnetic electric motor instead of an interior permanent magnet motor.

Figure 2:
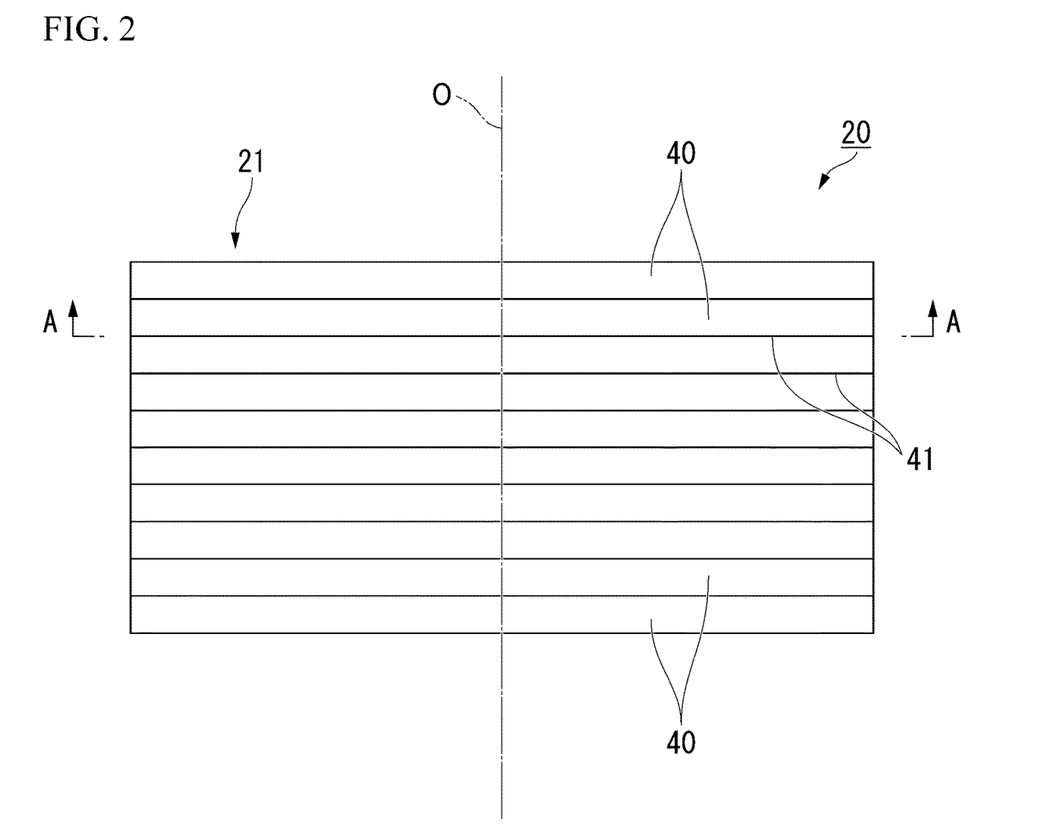
FIG. 2 is a side view of the laminated core for a stator.

The stator core 21 and the rotor core 31 are both laminated cores. As illustrated in FIG. 2, the stator core 21 may be formed by, for example, laminating a plurality of electrical steel sheets 40.

Further, laminated thicknesses (the entire length along the central axis O) of the stator core 21 and the rotor core 31 may each be, for example, 50.0 mm. An outer diameter of the stator core 21 may be, for example, 250.0 mm. An inner diameter of the stator core 21 may be, for example, 165.0 mm. An outer diameter of the rotor core 31 may be, for example, 163.0 mm. An inner diameter of the rotor core 31 may be, for example, 30.0 mm. However, these values are an example, and the laminated thickness, the outer diameter, and the inner diameter of the stator core 21, and the laminated thickness, the outer diameter, and the inner diameter of the rotor core 31 are not limited only to these values. Here, an edge portion of the tooth part 23 of the stator core 21 is used as a reference of the inner diameter of the stator core 21. That is, the inner diameter of the stator core 21 is a diameter of a virtual circle inscribed in the edge portions of all the tooth parts 23.

Each of the electrical steel sheets 40 forming the stator core 21 and the rotor core 31 may be formed by, for example, punching an electrical steel sheet serving as a base material or the like. As the electrical steel sheet 40, a known electrical steel sheet can be used. A chemical composition of the electrical steel sheet 40 is not particularly limited. In the present embodiment, a non-grain-oriented electrical steel sheet is used as the electrical steel sheet 40. As the non-grain-oriented electrical steel sheet, for example, a non-grain-oriented electrical steel strip of JIS C 2552:2014 can be adopted.

However, as the electrical steel sheet 40, it is also possible to use a grain-oriented electrical steel sheet instead of a non-grain-oriented electrical steel sheet. As the grain-oriented electrical steel sheet, for example, a grain-oriented electrical steel strip of JIS C 2553:2012 can be adopted.

In order to improve workability of the electrical steel sheets and iron loss of the stator core, both sides of the electrical steel sheets 40 are preferably coated with an insulation coating. As a material constituting the insulation coating, for example, (1) an inorganic compound, (2) an organic resin, (3) a mixture of an inorganic compound and an organic resin, or the like can be adopted. As the inorganic compound, for example, (1) a compound of dichromate and boric acid, and (2) a compound of phosphate and silica or the like can be exemplified. As the organic resin, an epoxy resin, an acrylic resin, an acrylic-styrene resin, a polyester resin, a silicone resin, a fluorine resin, or the like can be exemplified.

When the electrical steel sheets 40 are coated with the insulation coating, a thickness of the insulation coating (average thickness per one surface of the electrical steel sheet 40) is preferably 0.1 μm or more to secure insulation performance between the electrical steel sheets 40 laminated on each other.

On the other hand, an insulating effect becomes saturated as the insulation coating becomes thicker. Also, as the insulation coating becomes thicker, a space factor decreases and performance of the stator core deteriorates. Therefore, the insulation coating is preferably made thin in a range in which the insulating performance can be secured. The thickness of the insulation coating (thickness per one surface of the electrical steel sheet 40) is preferably 0.1 μm or more and 2.0 μm or less, and more preferably 0.3 μm or more and 1.2 μm or less.

As a sheet thickness of the electrical steel sheet 40 becomes thinner, an effect of improving iron loss gradually saturates. Also, as the electrical steel sheet 40 becomes thinner, a manufacturing cost of the electrical steel sheet 40 increases. Therefore, the thickness of the electrical steel sheet 40 is preferably 0.10 mm or more when the effect of improving iron loss and the manufacturing costs are considered.

On the other hand, if the electrical steel sheet 40 is too thick, the iron loss increases. Therefore, when iron loss characteristics of the electrical steel sheet 40 are considered, the thickness of the electrical steel sheet 40 is preferably 0.35 mm or less, and more preferably 0.20 mm or 0.25 mm.

In consideration of the above-described points, the thickness of each electrical steel sheet 40 may be, for example, 0.10 mm or more and 0.65 mm or less, preferably 0.10 mm or more and 0.35 mm or less, and more preferably 0.20 mm or 0.25 mm. Further, the thickness of the electrical steel sheet 40 includes the thickness of the insulation coating.

As illustrated in FIG. 2, in the stator core 21, an adhesion part 41 that causes the electrical steel sheets 40 to be adhered to each other is partially provided between all sets of the electrical steel sheets 40 adjacent to each other in a stacking direction. All the sets of the electrical steel sheets 40 adjacent to each other in the stacking direction are laminated via the adhesion part 41 that is partially provided therebetween. The electrical steel sheets 40 adjacent to each other in the stacking direction are not fixed by other means (for example, fastening or the like).

The adhesion part 41 is one for causing the electrical steel sheets 40 adjacent to each other in the stacking direction to be adhered. The adhesion part 41 is an adhesive that is cured without being divided.

Figure 3:
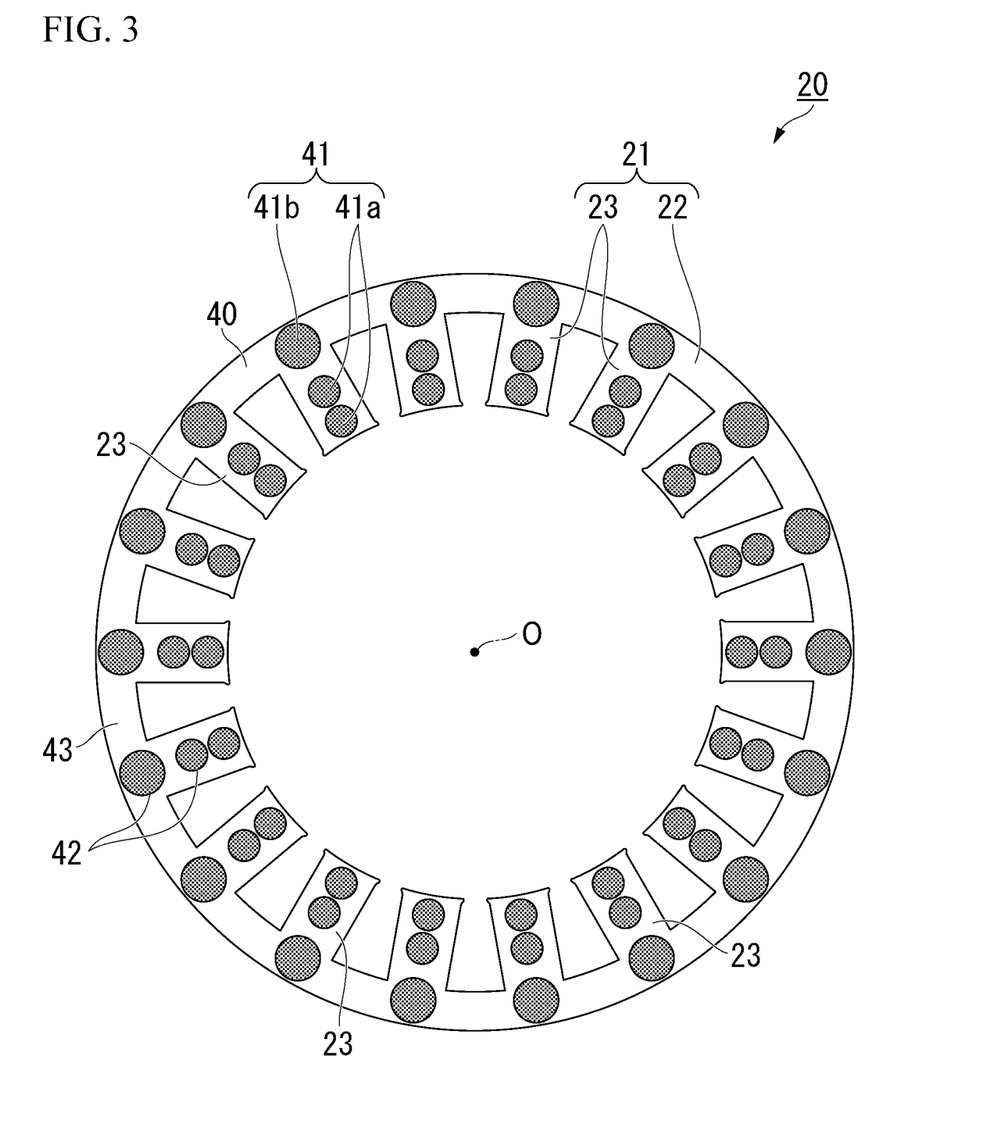
FIG. 3 is a cross-sectional view along line A-A of FIG. 2 and is a view illustrating an example of a disposition pattern of an adhesion part of the adhesively-laminated core for a stator.

As illustrated in FIG. 3, the adhesion part 41 includes a first adhesion part 41a and a second adhesion part 41b. The first adhesion part 41a is a fast-curing type adhesive that is cured without being divided. The second adhesion part 41b is a thermosetting adhesive that is cured without being divided. The first adhesion part 41a and the second adhesion part 41b are formed in a dot shape between the electrical steel sheets 40 adjacent to each other in the stacking direction.

A thickness of the adhesion part 41 is preferably 1 μm or more to obtain a stable and sufficient adhesion strength.

On the other hand, when the thickness of the adhesion part 41 exceeds 10 an adhesion force is saturated. Also, as the adhesion part 41 becomes thicker, a space factor decreases, and magnetic properties such as iron loss of the stator core deteriorate. Therefore, the thickness of the adhesion part 41 is preferably 1 μm or more and 10 μm or less, and more preferably 1 μm or more and 5 μm or less.

Further, in the above description, the thickness of the adhesion part 41 means an average thickness of the adhesion parts 41.

The average thickness of the adhesion parts 41 is more preferably 1.0 μm or more and 3.0 μm or less. When the average thickness of the adhesion parts 41 is less than 1.0 μm, a sufficient adhesion force cannot be secured as described above. Therefore, a lower limit value of the average thickness of the adhesion parts 41 is 1.0 μm, and more preferably 1.2 μm. Conversely, when the average thickness of the adhesion parts 41 increases more than 3.0 μm, a problem such as a large increase in strain amount of the electrical steel sheet 40 due to thermosetting shrinkage occurs. Therefore, an upper limit value of the average thickness of the adhesion parts 41 is 3.0 μm, and more preferably 2.6 μm.

The average thickness of the adhesion parts 41 is an average value as the entire laminated core. The average thickness of the adhesion parts 41 hardly changes throughout laminated positions in the stacking direction and circumferential positions around the central axis of the laminated core. Therefore, the average thickness of the adhesion parts 41 can be set to an average value of numerical values measured at 10 or more points in the circumferential direction at upper end positions of the laminated core.

The adhesion part 41 is partially provided between the electrical steel sheets 40 adjacent to each other in the stacking direction. That is, an adhesion region 42 and a non-adhesion region 43 are formed on a surface (first surface) of the electrical steel sheet 40 facing in the stacking direction. The adhesion region 42 is a region of the first surface of the electrical steel sheet 40 at which the adhesion part 41 is provided, that is, a region of the first surface of the electrical steel sheet 40 at which the adhesive cured without being divided is provided. The non-adhesion region 43 is a region of the first surface of the electrical steel sheet 40 at which the adhesion part 41 is not provided, that is, a region of the first surface of the electrical steel sheet 40 at which the adhesive cured without being divided is not provided. Between the electrical steel sheets 40 adjacent to each other in the stacking direction in the stator core 21, it is preferable that the adhesion part 41 be partially provided between the core back parts 22 and be partially provided between the tooth parts 23 as well.

Typically, the adhesion part 41 is disposed to be distributed to a plurality of positions between the electrical steel sheets 40 adjacent to each other in the stacking direction.

FIG. 3 is an example of a disposition pattern of the adhesion part 41. In this example, the first adhesion part 41a and the second adhesion part 41b are formed in a plurality of circular dots. More specifically, in the core back part 22, a plurality of second adhesion parts 41b are formed in a dot shape with an average diameter of 7 mm at equiangular intervals in the circumferential direction. Some of each second adhesion part 41b protrudes to the tooth part 23. In the tooth part 23, a plurality of first adhesion parts 41a are formed in a dot shape with an average diameter of 5 mm in the radial direction.

The average diameter illustrated here is an example. The average diameter of the dot-shaped second adhesion part 41b is preferably 5 mm or more and 10 mm or less, and more preferably 6 mm or more and 10 mm or less. The average diameter of the dot-shaped first adhesion part 41a is preferably 3 mm or more and 7 mm or less, and more preferably 3 mm or more and less than 6 mm. The average diameter of the first adhesion part 41a is preferably smaller than the average diameter of the second adhesion part 41b.

Further, the formation pattern of FIG. 3 is an example, and the number, shape, and disposition of the adhesion parts 41 provided between the electrical steel sheets 40 can be appropriately changed as necessary.

The average diameter can be obtained by measuring diameters of adhesive marks of the adhesion parts 41 when the electrical steel sheets 40 are broken away from each other with a ruler. When a shape of the adhesive mark in a plan view is not a perfect circle, a diameter thereof is set as a diameter of a circumscribed circle (perfect circle) of the adhesive mark in a plan view.

Average diameters of the first adhesion part and the second adhesion part in the tooth parts and the core back part may not be the same.

Generally, curing shrinkage occurs when an adhesive is cured. Due to the curing shrinkage, compressive stress and tensile stress are applied to the electrical steel sheets 40. When these stresses are applied to the electrical steel sheets 40, a strain is caused. Particularly, in a case of a thermosetting adhesive, the applied stress increases due to a difference in thermal expansion coefficient between the electrical steel sheet 40 and the adhesion part. The strain of the electrical steel sheet 40 increases iron loss of the electric motor 10. An influence of the strain of the electrical steel sheet 40 constituting the stator core 21 on the iron loss is larger than an influence of the strain of the steel sheet constituting the rotor core 31 on the iron loss.

In the present embodiment, since the adhesion part 41 is partially provided, the stress applied to the electrical steel sheet 40 due to curing shrinkage is reduced compared to a case in which the adhesion part 41 is provided on the entire surface.

A fast-curing type adhesive is cured in a short period of time at room temperature and has a smaller curing shrinkage than the thermosetting adhesive. Also, the influence of the strain of the electrical steel sheet 40 on the iron loss is larger in the tooth part 23 than that in the core back part 22. Therefore, when the thermosetting adhesive is applied to the core back part 22 to form the second adhesion part 41b and the fast-curing type adhesive is applied to the tooth part 23 to form the first adhesion part 41a as in the present embodiment, increase in iron loss can be further suppressed.

Also, when the adhesion part is partially provided between the electrical steel sheets by combining a temporary adhesion using the fast-curing type adhesive that is cured in a short period of time and a main adhesion using the thermosetting adhesive that has a high mechanical strength after curing to cause the electrical steel sheets to be adhered, a stator core that combines high productivity, a high strength, low noise, and low vibration can be obtained.

An adhesion area ratio $Q_0$ of the adhesion part 41 to the electrical steel sheet 40 is preferably 10% or more and 90% or less, more preferably 20% or more and 85% or less, and still more preferably 30% or more and 70% or less. When the adhesion area ratio $Q_0$ is equal to or higher than the lower limit value of the above-described range, a mechanical strength of the laminated core is secured. When the adhesion area ratio $Q_0$ is equal to or lower than the upper limit value of the above-described range, an effect of suppressing the iron loss is more excellent.

Further, the adhesion area ratio $Q_0$ is a proportion of an area occupied by the adhesion part 41 (the adhesion region 42) in the first surface of the electrical steel sheet 40 with respect to an area of the first surface of the electrical steel sheet 40. Both the first adhesion part and the second adhesion part present on the first surface of the tooth part are included in calculating the adhesion area ratio $Q_0$.

An adhesion area ratio $Q_{A0}$ of the adhesion part 41 to the core back part 22 is preferably 40% or more and 90% or less, more preferably 50% or more and 90% or less, and still more preferably 60% or more and 90% or less. When the adhesion area ratio $Q_{A0}$ is equal to or higher than the lower limit value of the above-described range, since the electrical steel sheets 40 adjacent to each other in the stacking direction can be adhered to each other with a sufficient adhesion strength, a rigidity of the stator core improves and noise characteristics are excellent. When the adhesion area ratio $Q_{A0}$ is equal to or lower than the upper limit value of the above-described range, an effect of suppressing the iron loss is more excellent.

Further, the adhesion area ratio $Q_{A0}$ is a proportion of an area occupied by the adhesion part 41 (the adhesion region 42) in the first surface of the core back part 22 with respect to an area of the first surface of the core back part 22 of the electrical steel sheet 40. Both the first adhesion part and the second adhesion part present on the first surface of the core back part are included in calculating the adhesion area ratio $Q_{A0}$. For example, when some of the first adhesion part 41a formed with the fast-curing type adhesive applied to the tooth part 23 is also present in the core back part 22, the adhesion area ratio $Q_{A0}$ is calculated including that portion as well.

An adhesion area ratio $Q_{A1}$ of the first adhesion part 41a to the core back part 22 is preferably 0% or more and 50% or less, more preferably 0% or more and 40% or less, and still more preferably 0% or more and 30% or less. When the adhesion area ratio $Q_{A1}$ is equal to or higher than the lower limit value of the above-described range, a temporary fixing effect can be obtained. When the adhesion area ratio $Q_{A1}$ is not higher than the upper limit value of the above-described range, an effect of suppressing the iron loss is more excellent.

Further, the adhesion area ratio $Q_{A1}$ is a proportion of an area occupied by the first adhesion part 41a in the first surface of the core back part 22 with respect to the area of the first surface of the core back part 22 of the electrical steel sheet 40.

An adhesion area ratio $Q_{A2}$ of the second adhesion part 41b to the core back part 22 is preferably 5% or more and 90% or less, more preferably 15% or more and 70% or less, and still more preferably 30% or more and 65% or less. When the adhesion area ratio $Q_{A2}$ is equal to or higher than the lower limit value of the above-described range, an effect of improving a rigidity of the laminated core can be obtained. When the adhesion area ratio $Q_{A2}$ is equal to or lower than the upper limit value of the above-described range, an effect of suppressing the iron loss is more excellent.

Further, the adhesion area ratio $Q_{A2}$ is a proportion of an area occupied by the second adhesion part 41b in the first surface of the core back part 22 with respect to the area of the first surface of the core back part 22 of the electrical steel sheet 40.

An adhesion area ratio $Q_{B0}$ of the adhesion part 41 to the tooth part 23 is preferably 10% or more and 70% or less, more preferably 10% or more and 50% or less, and still more preferably 10% or more and 30% or less. When the adhesion area ratio $Q_{B0}$ is equal to or higher than the lower limit value of the above-described range, since the electrical steel sheets 40 adjacent to each other in the stacking direction can be adhered to each other with a sufficient adhesion strength, jumping of the tooth part can be suppressed, and thus a core shape is excellent. When the adhesion area ratio $Q_{B0}$ is equal to or lower than the upper limit value of the above-described range, an effect of suppressing the iron loss is more excellent.

Further, the adhesion area ratio $Q_{B0}$ is a proportion of an area occupied by the adhesion part 41 (the adhesion region 42) in the first surface of the tooth part 23 with respect to an area of the first surface of the tooth part 23 of the electrical steel sheet 40. Both the first adhesion part and the second adhesion part present on the first surface of the tooth part are included in calculating the adhesion area ratio $Q_{B0}$. For example, when some of the second adhesion part 41b formed with the thermosetting adhesive applied to the core back part 22 is also present on the tooth part 23, the adhesion area ratio $Q_{B0}$ is calculated including that portion as well.

An adhesion area ratio $Q_{B1}$ of the tooth part 23 by the first adhesion part 41a is preferably 5% or more and 70% or less, more preferably 6% or more and 50% or less, and still more preferably 7% or more and 30% or less. When the adhesion area ratio $Q_{B1}$ is equal to or higher than the lower limit value of the above-described range, an effect of preventing the tooth part from being displaced can be obtained. When the adhesion area ratio $Q_{B1}$ is equal to or lower than the upper limit value of the above-described range, an effect of suppressing the iron loss is more excellent.

Further, the adhesion area ratio $Q_{B1}$ is a proportion of an area occupied by the first adhesion part 41a on the first surface of the tooth part 23 with respect to the area of the first surface of the tooth part 23 of the electrical steel sheet 40.

An adhesion area ratio $Q_{B2}$ of the second adhesion part 41b to the tooth part 23 is preferably 0% or more and 65% or less, more preferably 0% or more and 50% or less, and still more preferably 0% or more and 30% or less. The adhesion area ratio $Q_{B2}$ may be 0%. When the adhesion area ratio $Q_{B2}$ is equal to or lower than the upper limit value of the above-described range, an effect of suppressing the iron loss is more excellent.

Further, the adhesion area ratio $Q_{B2}$ is a proportion of an area occupied by the second adhesion part 41b on the first surface of the tooth part 23 with respect to the area of the first surface of the tooth part 23 of the electrical steel sheet 40.

Between the electrical steel sheets 40 adjacent to each other in the stacking direction, a proportion (proportion $P_1$) of an adhesion area of the first adhesion part 41a with respect to a total adhesion area of the adhesion part 41 is preferably 5% or more and 50% or less, and a proportion (proportion $P_2$) of an adhesion area of the second adhesion part 41b with respect thereto is preferably 50% or more and 95% or less. Thereby, an effect of improving the mechanical strength, an effect of reducing noise and vibration, and an effect of suppressing the iron loss can be sufficiently obtained. Also, it is more preferable that the proportion $P_1$ be 5% or more and less than 50% and the proportion $P_2$ be 50% or more and 95% or less, it is still more preferable that the proportion $P_1$ be 10% or more and 40% or less and the proportion $P_2$ be 60% or more and 90% or less, it is particularly preferable that the proportion $P_1$ be 15% or more and 40% or less and the proportion $P_2$ be 60% or more and 85% or less, and it is most preferable that the proportion $P_1$ be 15% or more and 35% or less and the proportion $P_2$ be 65% or more and 85% or less. A sum of the proportion $P_1$ and the proportion $P_2$ is 100%.

In calculating the adhesion area ratios $Q_0$, $Q_{A0}$, $Q_{A1}$, $Q_{A2}$, $Q_{B0}$, $Q_{B1}$, and $Q_{B2}$, and the proportions $P_1$ and $P_2$, an area of the adhesive marks obtained by an image analysis of the adhesive marks of the adhesion part 41, the first adhesion part 41a, or the second adhesion part 41b after the electrical steel sheets 40 are broken away from each other is employed as an area of the adhesion region formed by each adhesion part.

In the present embodiment, it is preferable that the first adhesion part 41a have a dot shape with an average diameter of 3 mm or more and 7 mm or less, the second adhesion part 41b have a dot shape with an average diameter of 5 mm or more and 10 mm or less, the proportion $P_1$ be 5% or more and less than 50%, and the proportion $P_2$ be 50% or more and 95% or less. Also, it is more preferable that the first adhesion part 41a have a dot shape with an average diameter of 3 mm or more and 7 mm or less, the second adhesion part 41b have a dot shape with an average diameter of 5 mm or more and 10 mm or less, the proportion $P_1$ be 5% or more and less than 50%, the proportion $P_2$ be 50% or more and 95% or less, the adhesion area ratio $Q_{B0}$ be 10% or more and 50% or less, and the adhesion area ratio $Q_{B1}$ be 6% or more and 50% or less.

The fast-curing type adhesive is one in which a monomer in a liquid state is instantly polymerized by a very small amount of moisture in the air or on a surface of an adherend to exhibit an adhesiveness.

As the fast-curing type adhesive, for example, a cyanoacrylate-based adhesive and an anaerobic adhesive can be exemplified. Of these, the cyanoacrylate-based adhesive known as an instant adhesive is preferable in terms of being excellent in fast-curing properties.

As the cyanoacrylate-based adhesive, an adhesive in which cyanoacrylate is polymerized and cured can be used without limitation. As the cyanoacrylate contained in the cyanoacrylate-based adhesive, for example, methyl cyanoacrylate, ethyl cyanoacrylate, methoxyethyl cyanoacrylate, butyl cyanoacrylate, and octyl cyanoacrylate can be exemplified. The cyanoacrylate contained in the cyanoacrylate-based adhesive may be one type or two or more types.

The thermosetting adhesive may be a one-component type or a two-component type.

As the thermosetting adhesive, for example, an epoxy resin-based adhesive, a phenol resin-based adhesive, and an unsaturated polyester resin-based adhesive can be exemplified. Of these, the epoxy resin-based adhesive is preferable from a viewpoint in which a stator core having a high mechanical strength can be easily obtained.

The epoxy resin-based adhesive contains an epoxy resin and a curing agent.

The epoxy resin is not particularly limited, and for example, a bisphenol A type epoxy resin, a bisphenol F type epoxy resin, a bisphenol AD type epoxy resin, an amine type epoxy resin, an alicyclic epoxy resin, a phenol novolac type epoxy resin, and a naphthalene type epoxy resin can be exemplified. Of these, the phenol novolac type epoxy resin is preferable from a viewpoint of application properties.

The curing agent contained in the epoxy resin-based adhesive may be one type or two or more types.

A glass transition temperature (Tg) of the epoxy resin is preferably 80° C. or higher and 150° C. or lower, more preferably 100° C. or higher and 150° C. or lower, and still more preferably 120° C. or higher and 150° C. or lower. When the Tg of the epoxy resin is equal to or higher than the lower limit value of the above-described range, a stator core having excellent heat resistance and high mechanical strength can be easily obtained. When the Tg of the epoxy resin is equal to or lower than the upper limit value of the above-described range, adhesion to the electrical steel sheet can be easily obtained.

Further, the Tg of the epoxy resin is a midpoint glass transition temperature measured by a differential scanning calorimetry (DSC) method according to JIS K 7121-1987.

A number average molecular weight (Mn) of the epoxy resin is preferably 1200 or more and 20000 or less, more preferably 2000 or more and 18000 or less, and still more preferably 2500 or more and 16000 or less. When the Mn of the epoxy resin is equal to or more than the lower limit value of the above-described range, an adhesion strength can be easily increased. When the Mn of the epoxy resin is not more than the upper limit value of the above-described range, the epoxy resin-based adhesive becoming highly viscous is easily suppressed.

Further, the Mn of the epoxy resin can be measured by size-exclusion chromatography (SEC) described in JIS K 7252-1:2008 using polystyrene as a standard substance.

For the curing agent, a generally used thermosetting epoxy resin curing agent can be used. The curing agent is not particularly limited, and for example, an acid anhydride-based curing agent (phthalic anhydride, hexahydrophthalic anhydride, 4-methylhexahydrophthalic anhydride, or the like), a phenol novolac resin, and dicyandiamide (DICY) can be exemplified. The curing agent contained in the epoxy resin-based adhesive may be one type or two or more types.

The phenol novolac resin is a novolak type phenol resin obtained by subjecting phenols (phenol or the like) and aldehydes (formaldehyde or the like) to a condensation reaction using an acid catalyst. As the curing agent, the phenol novolac resin is preferable from a viewpoint in which a stator core having a high mechanical strength can be easily obtained.

A curing agent content in the epoxy resin-based adhesive can be appropriately set according to types of curing agents, and for example, when a phenol novolac resin is used, 5 parts by mass or more and 35 parts by mass or less with respect to 100 parts by mass of the epoxy resin is preferable.

The epoxy resin-based adhesive may contain an acrylic resin in addition to the epoxy resin and the curing agent. An acrylic modified epoxy resin obtained by graft-polymerizing the acrylic resin on the epoxy resin may also be used.

The acrylic resin is not particularly limited. As monomers used for the acrylic resin, for example, unsaturated carboxylic acids such as acrylic acid and methacrylic acid, and (meth) acrylates such as methyl (meth) acrylate, ethyl (meth) acrylate, n-butyl (meth) acrylate, cyclohexyl (meth) acrylate, 2-ethylhexyl (meth) acrylate, 2-hydroxyethyl (meth) acrylate, and hydroxypropyl (meth) acrylate can be exemplified. Further, the (meth) acrylate means acrylate or methacrylate.

A number average molecular weight (Mn) of the acrylic resin is preferably 5000 or more and 100000 or less, more preferably 6000 or more and 80000 or less, and still more preferably 7000 or more and 60000 or less. When the Mn of the acrylic resin is equal to or more than the lower limit value of the above-described range, an adhesion strength can be easily increased. When the Mn of the acrylic resin is not more than the upper limit value of the above-described range, the epoxy resin-based adhesive becoming highly viscous is easily suppressed.

Further, the Mn of the acrylic resin can be measured by the same method as that in the Mn of the epoxy resin.

When the epoxy resin-based adhesive contains an acrylic resin, an acrylic resin content is not particularly limited, and can be, for example, 20% by mass or more and 80% by mass or less with respect to a total amount of the epoxy resin and the acrylic resin.

In the present embodiment, a plurality of electrical steel sheets forming the rotor core 31 are fixed to each other by fastening (dowel). However, the plurality of electrical steel sheets forming the rotor core 31 may also have a laminated structure fixed by an adhesive as in the stator core 21.

Further, the laminated cores such as the stator core 21 and the rotor core 31 may also be formed by so-called turn-stacking.

(Method of Manufacturing Stator Core)

The stator core 21 can be manufactured, for example, by repeating an operation in which the fast-curing type adhesive and the thermosetting adhesive are applied to a part of a surface of the electrical steel sheet 40, the electrical steel sheet 40 is stacked on another electrical steel sheet, and then the electrical steel sheets are press-stacked to form the adhesion part 41 at room temperature (for example, 20° C. or higher and 30° C. or lower).

Curing of the applied fast-curing type adhesive progresses at room temperature, and the first adhesion part 41a is formed. Also, curing of the thermosetting adhesive progresses due to heating at the time of the press-stacking, and the second adhesion part 41b is formed.

Either the fast-curing type adhesive or the thermosetting adhesive may be applied first or they may be applied at the same time. Also, the fast-curing type adhesive and the thermosetting adhesive may be applied individually or may be applied in a mixed state.

Hereinafter, a method of manufacturing the stator core 21 using a manufacturing device 100 illustrated in FIG. 4 will be described.

First, the manufacturing device 100 will be described. In the manufacturing device 100, while an electrical steel sheet P is sent in an arrow F direction from a coil C (hoop), the electrical steel sheet P is punched a plurality of times by a mold disposed at each stage to be gradually formed into a shape of the electrical steel sheet 40, the fast-curing type adhesive and the thermosetting adhesive are applied to predetermined positions on a lower surface of a second and subsequent electrical steel sheets 40, and the punched-out electrical steel sheets 40 are sequentially laminated and press-stacked while being heated.

Figure 4:
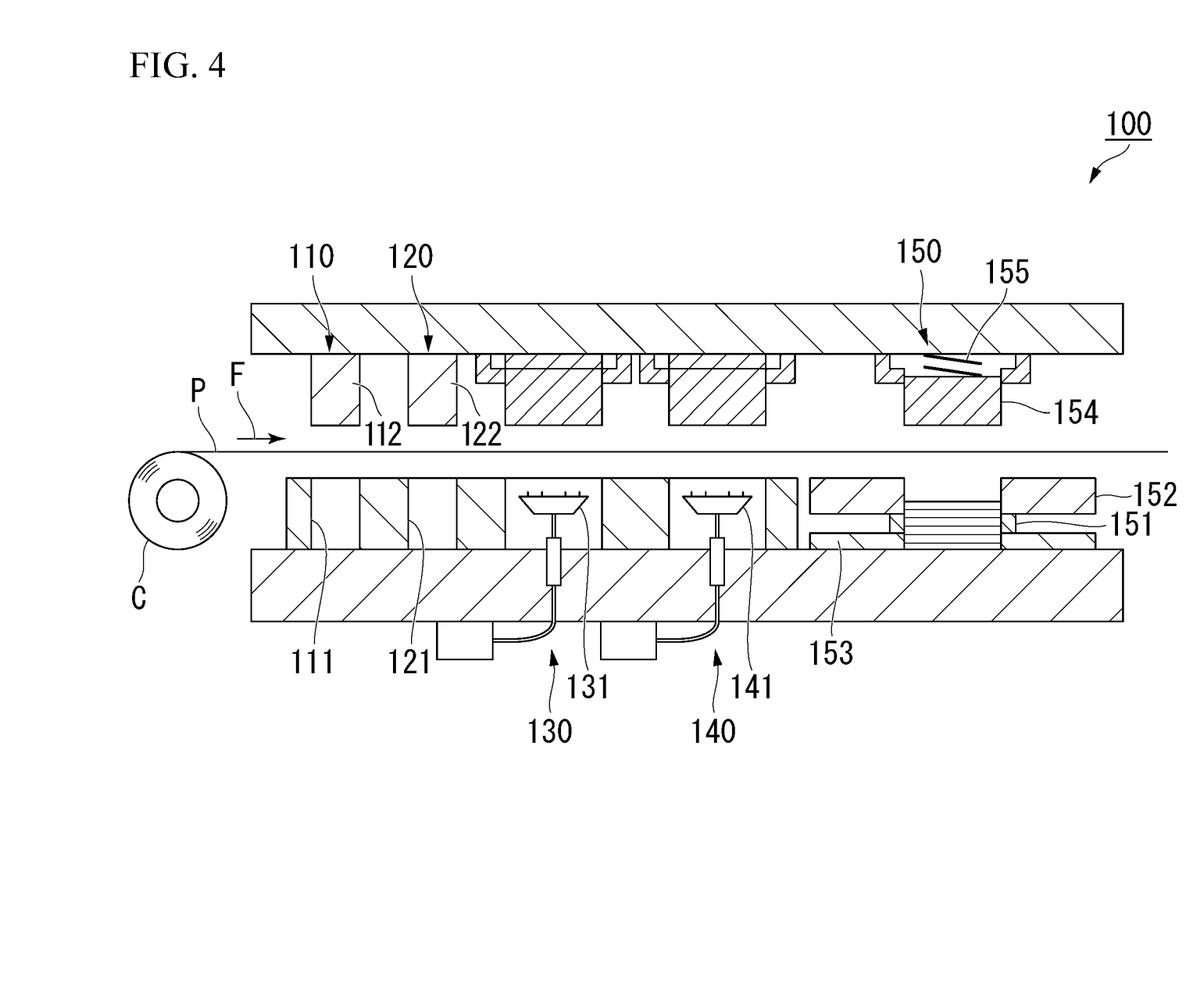
FIG. 4 is a side view illustrating a schematic configuration of a manufacturing device of the adhesively-laminated core for a stator.

As illustrated in FIG. 4, the manufacturing device 100 includes a first stage punching station 110 at a position closest to the coil C, a second stage punching station 120 disposed adjacent to the punching station 110 on a downstream side in a conveying direction of the electrical steel sheet P, a first adhesive-coating station 130 disposed adjacent to the punching station 120 on a further downstream side, and a second adhesive-coating station 140 disposed adjacent to the first adhesive-coating station 130 on a further downstream side.

The punching station 110 includes a female mold 111 disposed below the electrical steel sheet P and a male mold 112 disposed above the electrical steel sheet P.

The punching station 120 includes a female mold 121 disposed below the electrical steel sheet P and a male mold 122 disposed above the electrical steel sheet P.

The first adhesive-coating station 130 and the second adhesive-coating station 140 respectively include an applicator 131 and an applicator 141 each having a plurality of injectors disposed according to a disposition pattern of the adhesion part 41 described above.

The manufacturing device 100 further includes a stacking station 150 at a position downstream of the second adhesive-coating station 140. The stacking station 150 includes a heating device 151, a fixed mold for outer shape 152, a heat insulation member 153, a fixed mold for inner shape 154, and a spring 155.

The heating device 151, the fixed mold for outer shape 152, and the heat insulation member 153 are disposed below the electrical steel sheet P.

The fixed mold for inner shape 154 and the spring 155 are disposed above the electrical steel sheet P.

<Punching Step>

In the manufacturing device 100 having the above-described configuration, first, the electrical steel sheet P is sequentially sent from the coil C in the arrow F direction of FIG. 4. Then, punching processing by the punching station 110 is first performed with respect to the electrical steel sheet P. Next, punching processing by the punching station 120 is performed with respect to the electrical steel sheet P. Due to punching processing of these, a shape of the electrical steel sheet 40 having the core back part 22 and the plurality of tooth parts 23 illustrated in FIG. 3 is obtained in the electrical steel sheet P. However, since it is not completely punched out at this point, the processing proceeds to the next step in the arrow F direction.

<Application Step>

In the first adhesive-coating station 130 of the next step, the fast-curing type adhesive is supplied from the injectors of the applicator 131 to be applied in a dot shape to a plurality of positions on a lower surface of the tooth part 23 of the electrical steel sheet 40. Further, in the second adhesive-coating station 140, the thermosetting adhesive is supplied from the injectors of the applicator 141 to be applied in a dot shape to a plurality of positions on a lower surface of the core back part 22 of the electrical steel sheet 40.

<Laminating Step>

Next, the electrical steel sheet P is sent to the stacking station 150, punched out by the fixed mold for inner shape 154, and laminated with high accuracy. For example, when a notch is formed at a plurality of positions on an outer circumferential end portion of the core back part and a scale is pressed against the notches from a side surface, the electrical steel sheets 40 can be prevented from being displaced and can be laminated with higher accuracy. At the time of the lamination, the electrical steel sheet 40 is heated to, for example, 150° C. or higher and 160° C. or lower by the heating device 151 while receiving a constant pressing force by the spring 155. Curing of the thermosetting adhesive is accelerated by the heating.

The punching step, the application step, and the laminating step as described above are sequentially repeated, and thereby a predetermined number of electrical steel sheets 40 can be laminated via the partially provided adhesion part 41.

The stator core 21 is completed by the above steps.

A method of manufacturing the stator core is not limited to the above-described method. For example, the thermosetting adhesive may be applied at the first adhesive-coating station 130, and the fast-curing type adhesive may be applied at the second adhesive-coating station 140. Also, at either or both of the first adhesive-coating station 130 and the second adhesive-coating station 140, the thermosetting adhesive and the fast-curing type adhesive may be individually applied, and the thermosetting adhesive and the fast-curing type adhesive may be applied in a mixed state.

Further, the technical scope of the present invention is not limited to the above-described embodiments, and various modifications can be made without departing from the meaning of the present invention.

The adhesion part for causing the electrical steel sheets to be adhered to each other preferably includes two types of the first adhesion part formed with the fast-curing type adhesive and the second adhesion part formed with the thermosetting adhesive but may also include a third adhesion part formed with an adhesive in which the fast-curing type adhesive and the thermosetting adhesive are mixed. When the adhesion part for causing the electrical steel sheets to be adhered to each other includes the third adhesion part, the adhesion part may include only the third adhesion part or may include a combination of either or both of the first adhesion part and the second adhesion part and the third adhesion part.

A shape of the stator core is not limited to the form illustrated in the above-described embodiment. Specifically, dimensions of the outer diameter and inner diameter, a laminated thickness, and the number of slots of the stator core, a dimensional ratio of the tooth part in the circumferential direction and the radial direction, a dimensional ratio in the radial direction between the tooth part and the core back part, or the like can be arbitrarily designed according to desired characteristics of the electric motor.

In the rotor of the above-described embodiment, a set of two permanent magnets 32 forms one magnetic pole, but the present invention is not limited thereto. For example, one permanent magnet 32 may form one magnetic pole, or three or more permanent magnets 32 may form one magnetic pole.

In the above-described embodiment, the permanent magnetic electric motor has been described as an example of the electric motor, but a structure of the electric motor is not limited thereto as will be illustrated below, and furthermore, various known structures not illustrated below can also be employed.

In the above-described embodiment, the permanent magnetic electric motor has been described as an example of the electric motor, but the present invention is not limited thereto. For example, the electric motor may also be a reluctance motor or an electromagnet field motor (wound-field motor).

In the above-described embodiment, the synchronous motor has been described as an example of the AC motor, but the present invention is not limited thereto. For example, the electric motor may also be an induction motor.

In the above-described embodiment, the AC motor has been described as an example of the motor, but the present invention is not limited thereto. For example, the electric motor may be a DC motor.

In the above-described embodiment, the motor has been described as an example of the electric motor, but the present invention is not limited thereto. For example, the electric motor may be a generator.

The stator core 21 can also be employed in a transformer instead of the electric motor 10. In this case, a grain-oriented electrical steel sheet is preferably employed for the electrical steel sheet instead of the non-grain-oriented electrical steel sheet.

In addition, the components in the above-described embodiments can be appropriately replaced with well-known components within a range not departing from the meaning of the present invention, and the modified examples described above may be appropriately combined.

Hereinafter, the present invention will be specifically described with reference to examples, but the present invention is not limited to the following description.

(Adhesive)

Fast-curing type adhesive (A-1): Cyanoacrylate-based adhesive (product name "Aron Alpha", manufactured by Toagosei Co., Ltd.).

Thermosetting adhesive (B-1): Epoxy resin-based adhesive (product name "ThreeBond", manufactured by Three-Bond Co., Ltd., Tg of epoxy resin: 130° C.).

Example 1

A hoop having a composition for a non-grain-oriented electrical steel sheet containing 3.0% by mass of Si, 0.5% by mass of Al, and 0.1% by mass of Mn was prepared. A thickness of the base steel was 0.3 mm. An insulation coating treatment agent containing a metal phosphate and an acrylic resin emulsion was applied to the hoop and baking was performed at 300° C. so that the hoop is coated with an insulation coating in a predetermined amount.

A stator core was fabricated by punching the hoop (electrical steel sheet) into a single-plate core which has a ring shape with an outer diameter of 200 mm and an inner diameter of 134 mm and to which 18 rectangular tooth parts 23 each having a length of 23 mm and a width of 15 mm are provided on an inner diameter side and then laminating it in sequence using the manufacturing device 100 having the configuration illustrated in FIG. 4 by the following procedures.

The hoop was sequentially sent in the arrow F direction of FIG. 4 from the coil C. Then, punching processing by the punching station 110 was first performed with respect to the hoop, and next, punching processing by the punching station 120 was performed with respect to the hoop. Due to punching processing of these, a shape of the electrical steel sheet 40 having the core back part 22 and the plurality of tooth parts 23 illustrated in FIG. 3 was formed in the hoop (punching step).

Next, the fast-curing type adhesive (A-1) was applied in a dot shape to predetermined positions on a lower surface (the first surface) of the tooth parts 23 of the hoop using the applicator 131 at the first adhesive-coating station 130. Next, the thermosetting adhesive (B-1) was applied in a dot shape to predetermined positions on the lower surface (the first surface) of the core back part 22 of the hoop using the applicator 141 at the second adhesive-coating station 140 (application step).

Next, the hoop sent to the stacking station 150 was punched into a single-plate core by the fixed mold for inner shape 154 and then laminated while being pressurized (laminating step). At this time, the adhesive was heated to 80° C. by the heating device 151 to accelerate curing of the adhesive.

The punching step, the application step, and the laminating step described above were sequentially repeated to laminate 130 single-plate cores. An average diameter of the first adhesion part formed with the fast-curing type adhesive (A-1) between the electrical steel sheets 40 was 5 mm. An average diameter of the second adhesion part formed with the thermosetting adhesive (B-1) was 8 mm. The adhesion area ratios $Q_0$, $Q_{A0}$, $Q_{A1}$, $Q_{A2}$, $Q_{B0}$, $Q_{B1}$, and $Q_{B2}$, and the proportions $P_1$ and $P_2$ were as shown in Table 1.

Examples 2 to 13

A stator core was fabricated in the same manner as in example 1 except that average diameters, the adhesion area ratios $Q_0$, $Q_{A0}$, $Q_{A1}$, $Q_{A2}$, $Q_{B0}$, $Q_{B1}$ and $Q_{B2}$, and the proportions $P_1$ and $P_2$ of the first adhesion part and the second adhesion part were as shown in Tables 1 and 2.

Comparative Example 1

The fast-curing type adhesive (A-1) was applied to the first surface of the tooth part in the same manner as in example 1 for a temporary adhesion, thereafter the metal steel sheets were entirely adhered to each other by being vacuum-impregnated with the thermosetting adhesive (B-1), and thereby a stator core having the adhesion area ratios $Q_0$, $Q_{A0}$, $Q_{A1}$, $Q_{A2}$, $Q_{B0}$, $Q_{B1}$, and $Q_{B2}$ and the proportions $P_1$ and $P_2$ as shown in Table 2 was fabricated.

Comparative Example 2

A stator core was fabricated in the same manner as in example 1 except that an adhesive used was only the fast-curing type adhesive (A-1), and the adhesion area ratios $Q_0$, $Q_{A0}$, $Q_{A1}$, $Q_{A2}$, $Q_{B0}$, $Q_{B1}$, and $Q_{B2}$ and the proportions $P_1$ and $P_2$ were as shown in Table 2.

Comparative Example 3

A stator core was fabricated in the same manner as in example 1 except that an adhesive used was only the thermosetting adhesive (B-1), and the adhesion area ratios $Q_0$, $Q_{A0}$, $Q_{A1}$, $Q_{A2}$, $Q_{B0}$, $Q_{B1}$, and $Q_{B2}$ and the proportions $P_1$ and $P_2$ were as shown in Table 2.

(Evaluation)

The following evaluation was performed on the stator core of each example. The results are shown in Tables 1 and 2.

<Core Strength>

After dropping the stator core from a height of 1 m, a core strength was evaluated by measuring the number of sets of the electrical steel sheets in which a gap was generated between the electrical steel sheets among all the sets of the electrical steel sheets adjacent to each other in the stacking direction. When a distance between the electrical steel sheets was larger than that before the dropping, it was determined that a gap was generated between the electrical steel sheets. A smaller number of sets of the electrical steel sheets in which a gap was generated between the electrical steel sheets means higher core strength.

○: The number of sets of the electrical steel sheets in which a gap generated between the electrical steel sheets was less than 1. That is, this is a case in which no problem has occurred in the stator core.

Δ: The number of sets of the electrical steel sheets in which a gap generated between the electrical steel sheets was 1 or more and less than 2. That is, this is a case in which a visible gap has generated in the stator core.

x: The number of sets of the electrical steel sheets in which a gap generated between the electrical steel sheets was 2 or more. That is, this is a case in which a plurality of visible gaps have generated or cracked in the stator core.

<Hammering Test (Noise Evaluation)>

An outer circumferential end portion of the core back part of the stator core was vibrated in the radial direction by an impact hammer, and a modal analysis of noise and vibration was performed with a distal end of the tooth part and a central portion of the core back part in a direction of 180° axially with respect to the vibration source as measurement points. Also, when a central portion of the core back part in the radial direction was vibrated in the axial direction by an impact hammer, a modal analysis of noise and vibration was performed with a distal end of the tooth part and a central portion of the core back part in a direction of 180° axially with respect to the vibration source as measurement points. The evaluation was performed according to the following criteria. A smaller value means that more noise can be suppressed.

1: Only one or two vibration peaks are detected.
2: Several vibration peaks are detected.
3: 10 or more vibration peaks are detected depending on a vibration direction.
4: There is a main peak, but 10 or more vibration peaks are detected.
5: There is no main peak, and 10 or more vibration peaks are detected.

<Iron Loss>

Stator iron loss was measured using a rotational iron loss-simulator having a rotor-shaped detector with a diameter of 133.5 mm. This rotational iron loss-simulator is one disclosed in the papers of technical meetings in the Institute of Electrical Engineers of Japan, RM-92-79, 1992.

In evaluation of iron loss of the stator core, a fixed by fastening-stacking core having 10 laminated sheets in which eight adhesion parts were formed in the core back part and a fastening with a diameter of 1.5 mm was formed in a central portion of all the tooth parts was fabricated as a core serving as evaluation criteria. The stator core and the fixed by fastening-stacking core in each example were measured using the rotational iron loss-simulator, and the iron loss was evaluated according to the following evaluation criteria.

○: Magnetism was better by 20% or more compared to that of the fixed by fastening-stacking core.
Δ: Magnetism was better in a range of 10% or more and less than 20% compared to that of the fixed by fastening-stacking core.
x: Improvement in magnetism compared to that of the fixed by fastening-stacking core was not observed, or improvement in magnetism was less than 10% compared to that of the fixed by fastening-stacking core.

<Productivity>

When the stator core was fabricated at 150 spm (the number of electrical steel sheets laminated in one minute was 150) using the manufacturing device illustrated in FIG. 4, a fixing state of the stator core taken out from the mold was checked and productivity of the stator was evaluated according to the following criteria.

○: The laminated core could be fabricated without any problem.
Δ: The electrical steel sheets were broken away from each other or lamination was twisted during handling.
x: Fixing between the electrical steel sheets was insufficient.

TABLE 1

| | | Example 1 | Example 2 | Example 3 | Example 4 | Example 5 | Example 6 | Example 7 | Example 8 |
|---|---|---|---|---|---|---|---|---|---|
| Applied adhesive | First adhesion part | Fast curing | Fast curing | Fast curing | Fast curing | Fast curing | Fast curing | Fast curing | Fast curing |
| | Second adhesion part | Thermosetting | Thermosetting | Thermosetting | Thermosetting | Thermosetting | Thermosetting | Thermosetting | Thermosetting |
| Adhesion area ratio $Q_0$ [%] | | 71 | 56 | 54 | 50 | 39 | 45 | 51 | 46 |
| Adhesion area ratio $Q_{A0}$ [%] | | 87 | 87 | 45 | 51 | 41 | 64 | 42 | 52 |
| Adhesion area ratio $Q_{A1}$ [%] | | 12 | 12 | 7 | 4 | 6 | 7 | 4 | 29 |
| Adhesion area ratio $Q_{A2}$ [%] | | 75 | 75 | 38 | 47 | 34 | 57 | 38 | 23 |
| Adhesion area ratio $Q_{B0}$ [%] | | 55 | 26 | 63 | 50 | 38 | 26 | 59 | 40 |
| Adhesion area ratio $Q_{B1}$ [%] | | 11 | 11 | 7 | 4 | 4 | 7 | 4 | 28 |
| Adhesion area ratio $Q_{B2}$ [%] | | 44 | 15 | 55 | 46 | 33 | 18 | 55 | 11 |
| Proportion $P_1$ [%] | | 16 | 21 | 14 | 8 | 13 | 16 | 8 | 63 |
| Proportion $P_2$ [%] | | 84 | 79 | 86 | 92 | 87 | 84 | 92 | 37 |
| Average diameter of first adhesion part [mm] | | 5 | 5 | 4 | 3 | 3 | 4 | 3 | 5 |
| Average diameter of second adhesion part [mm] | | 8 | 8 | 9 | 10 | 7 | 9 | 9 | 7 |
| Core strength | | ○ | ○ | ○ | ○ | Δ | ○ | ○ | ○ |
| Hammering test | | 2 | 2 | 1 | 1 | 3 | 1 | 2 | 1 |
| Iron loss | | ○ | ○ | ○ | ○ | ○ | ○ | Δ | Δ |
| Productivity | | ○ | ○ | ○ | Δ | Δ | ○ | Δ | ○ |

TABLE 2

| | | Example 9 | Example 10 | Example 11 | Example 12 | Example 13 | Comparative example 1 | Comparative example 2 | Comparative example 3 |
|---|---|---|---|---|---|---|---|---|---|
| Applied adhesive | First adhesion part | Fast curing | Fast curing | Fast curing | Fast curing | Fast curing | Fast curing | Fast curing | — |
| | Second adhesion part | Thermo-setting | Thermo-setting | Thermo-setting | Thermo-setting | Thermo-setting | Thermo-setting | — | Thermo-setting |
| Adhesion area ratio $Q_0$ [%] | | 46 | 33 | 36 | 59 | 65 | 100 | 32 | 21 |
| Adhesion area ratio $Q_{A0}$ [%] | | 41 | 42 | 47 | 79 | 71 | 100 | 52 | 23 |
| Adhesion area ratio $Q_{A1}$ [%] | | 11 | 19 | 5 | 11 | 11 | 0 | 52 | 0 |
| Adhesion area ratio $Q_{A2}$ [%] | | 30 | 23 | 42 | 67 | 60 | 100 | 0 | 23 |
| Adhesion area ratio $Q_{B0}$ [%] | | 51 | 24 | 26 | 40 | 58 | 100 | 11 | 19 |
| Adhesion area ratio $Q_{B1}$ [%] | | 7 | 7 | 2 | 7 | 15 | 100 | 11 | 0 |
| Adhesion area ratio $Q_{B2}$ [%] | | 44 | 17 | 25 | 33 | 44 | 0 | 0 | 19 |
| Proportion $P_1$ [%] | | 20 | 39 | 9 | 16 | 20 | 0 | 100 | 0 |
| Proportion $P_2$ [%] | | 80 | 61 | 91 | 84 | 80 | 100 | 0 | 100 |
| Average diameter of first adhesion part [mm] | | 4 | 4 | 2 | 4 | 4 | | 5 | |
| Average diameter of second adhesion part [mm] | | 8 | 5 | 6 | 12 | 8 | | | 7 |
| Core strength | | ○ | Δ | Δ | ○ | ○ | ○ | x | ○ |
| Hammering test | | 1 | 2 | 3 | 1 | 1 | 1 | 5 | 3 |
| Iron loss | | ○ | Δ | Δ | Δ | ○ | x | ○ | ○ |
| Productivity | | Δ | ○ | Δ | Δ | Δ | x | ○ | x |

INDUSTRIAL APPLICABILITY

According to the present invention, productivity and a mechanical strength of a laminated core for a stator are improved, and thus vibration and noise of an electric motor can be reduced and iron loss can be suppressed. Therefore, industrial applicability is high.

BRIEF DESCRIPTION OF THE REFERENCE SYMBOLS

10 Electric motor
20 Stator
21 Adhesively-laminated core for stator
40 Electrical steel sheet
41 Adhesion part
41a First adhesion part
41b Second adhesion part

The invention claimed is:

1. An adhesively-laminated core for a stator comprising:
a plurality of electrical steel sheets which are stacked to each other and each of which both surfaces coated with an insulation coating; and
an adhesion part which is disposed between the electrical steel sheets adjacent to each other in a stacking direction and adheres the electrical steel sheets to each other, wherein
all sets of the electrical steel sheets adjacent to each other in the stacking direction are adhered by a plurality of adhesion parts,
an adhesive forming the adhesion part includes a fast-curing type adhesive and a thermosetting adhesive,
the adhesion part is partially provided between the electrical steel sheets adjacent to each other in the stacking direction,
the adhesion part includes a first adhesion part formed with the fast-curing type adhesive and a second adhesion part formed with the thermosetting adhesive,
the adhesion part includes the first adhesion part provided between tooth parts of the electrical steel sheets the second adhesion part provided between core back parts of the electrical steel sheets,
the first adhesion part has an average diameter of 3 mm or more and 7 mm or less in a dot shape, the second adhesion part has an average diameter of 5 mm or more and 10 mm or less in a dot shape, and a proportion of an adhesion area of the first adhesion part is 5% or more and less than 50% and a proportion of an adhesion area of the second adhesion part is 50% or more and 95% or less with respect to a total adhesion area by the adhesion part between the electrical steel sheets,
an adhesion area ratio $Q_{B0}$ of the adhesion part to the tooth part is 10% or more and 70% or less and an adhesion area ratio $Q_{A0}$ of the adhesion part to the core back part is 40% or more and 90% or less between the electrical steel sheets,
an adhesion area ratio $Q_{A1}$ of the first adhesion part to the core back part is 4% or more and 30% or less,
an adhesion area ratio $Q_{A2}$ of the second adhesion part to the core back part is 15% or more and 90% or less,
an adhesion area ratio $Q_{B1}$ of the first adhesion part to the tooth part is 5% or more and 30% or less, and
an adhesion area ratio $Q_{B2}$ of the second adhesion part to the tooth part is 0% or more and 65% or less.

2. The adhesively-laminated core for a stator according to claim 1, wherein the fast-curing type adhesive is a cyanoacrylate-based adhesive.

3. The adhesively-laminated core for a stator according to claim 1, wherein the thermosetting adhesive is an epoxy resin-based adhesive containing an epoxy resin having a glass transition temperature of 80° C. or higher and 150° C. or lower.

4. A method of manufacturing an adhesively-laminated core for a stator according to claim 1, the method comprising repeating an operation in which the fast-curing type adhesive and the thermosetting adhesive are applied to a part of a surface of the electrical steel sheet, the electrical steel sheet is stacked on another electrical steel sheet, and then the electrical steel sheets are press-stacked to form the adhesion part.

5. An electric motor comprising the adhesively-laminated core for a stator according to claim 1.

* * * * *